2,980,689

2-AMINO-5-CHLORO-6-BROMOBENZOXAZOLE AND PHARMACEUTICALLY ACCEPTABLE SALTS

James N. Plampin, Philadelphia, Pa., assignor to McNeil Laboratories, Incorporated, Philadelphia, Pa., a corporation of Pennsylvania No Drawing. Filed Feb. 25, 1959, Ser. No. 795,357

3 Claims. (Cl. 260—307)

The present invention relates to novel chemical compounds; and, more particularly, the invention relates to 2–amino-5-chloro-6-bromobenzoxazole and pharmaceutically acceptable salts thereof possessing valuable pharmaceutical properties especially the ability to relax skeletal muscles and thus to relieve spasticity in animals and man, and uricosuric activity and thus the ability to increase the excretion of uric acid. The present application is a continuation-in-part of application Serial No. 634,159, filed January 15, 1957, now abandoned.

Spasticity is an uncontrolled, involuntary, excessive contraction of one or more skeletal muscles and is a major component of many common disease conditions. The manifestations of spasticity range in severity from those observed in minor transient injuries to localized areas, such as sprains and strains, through more serious conditions, such as chronic low back pain (lumbago), rheumatoid arthritis and rheumatoid spondylitis to the very severe incapacitating neurological diseases, such as multiple sclerosis, Parkinson's disease, cerebral palsy, and the like.

Mephenesin is known to relieve, in animals, experimentally induced spasticity, that is, to produce relaxation of the skeletal muscles, by a mechanism involving the depression of the polysynaptic pathways of the central nervous system. The activity of this compound is so low and the duration so brief, that it is not feasible to employ this material clinically for the relief of spasticity. In addition, as is known, the administration of this material produces undesirable side effects, such as initial excitement, salivation, nausea and vomiting.

The formation of deposits of uric acid in the system causes painful conditions, principally gout. Salicylates have been used for years as uricosuric agents, however substantial doses of at least 5 grams daily are required for the uricosic effect in patients with gout and few patients, particularly those in the older age group can tolerate these amounts for a sufficiently long period of time without suffering from mental confusion and salicylism. Cinchophen is a more potent uricosuric agent than the salicylates but its toxicity precludes its general use in gout. Probenecid has a uricosuric action similar to that of salicylate and cinchophen and is better tolerated. This material is presently the preferred agent for prolonged treatment of gout.

It is the principal object of the present invention to provide novel chemical compounds possessing valuable pharmaceutical properties.

It is another object of the present invention to provide novel chemical compounds possessing skeletal muscle relaxant properties.

It is still another object of the present invention to provide novel chemical compounds possessing skeletal muscle relaxant properties without deleterious side effects, such as initial excitement, salivation, nausea or vomiting.

A further object of the present invention is to provide novel chemical compounds capable of producing, at reasonable doses, useful relaxation of skeletal muscles and which possess a wide margin between the effective dose and the lethal dose.

A further object of the present invention is to provide novel chemical compounds that possess substantial uricosuric activity at dosage levels producing no deleterious side effects.

A specific object of the present invention is to provide novel benzoxazole derivatives which possess the skeletal muscle relaxant properties and free of undesirable side effects, referred to above, which also possess an unusually long period of activity upon administration.

Other objects, including the provision of novel medical preparations and compositions, a method for the relieving of spasticity in animals and man, and a method for increasing the excretion of uric acid, will become apparent from a consideration of the following specification and claims.

The novel compounds of the present invention are 2-amino-5-chloro-6-bromobenzoxazole and pharmaceutically acceptable salts thereof.

The compounds of the present invention have been found to produce relaxation of the skeletal muscles by a mechanism involving the depression of the polysynaptic pathways of the central nervous system. Compared to mephenesin, the present compounds are at least four times as active in producing relaxation when given orally, have a wide safety margin between effective dose and lethal dose and lack any significant side effects, including initial excitement, nausea, or vomiting. In addition to the foregoing, one of the principal features of the compounds of the present invention is their duration of activity upon administration. Thus, the compounds of the present invention, other conditions being the same, are capable of producing useful relaxation of skeletal muscles for a period of time substantially longer than other benzoxazole derivatives. For example, compounds of the present invention have been found to provide useful relaxation of skeletal muscle for a period of time of at least twelve times longer than a comparable dose of 2-amino-5-chlorobenzoxazole. The compounds of the present invention have also been found to possess significant uricosuric activity, that is the ability to increase the excretion of uric acid, and, hence, are useful in the treatment of conditions where increased uric acid elimination is indicated.

2-amino-5-chloro-6-bromobenzoxazole possesses basic properties enabling it to form addition salts with acids. Hence, this compound may be employed either as the base or as a salt. The acid forming the salt may be any inorganic or organic acid producing a pharmaceutically acceptable salt, for example, hydrochloric, hydrobromic, hydriodic, nitric, sulfuric, phosphoric and the like; acetic, propionic, caproic, stearic, and other acids of this series, and the like; maleic, crotonic, fumaric, oleic, citric, tartaric, lactic, benzoic, naphthoic, salicylic, methane sulphonic, camphor sulphonic, and the like.

If a salt is employed, the salt will be pharmaceutically acceptable, i.e. will be non-toxic in the amounts required for the desired activity, and any toxicity or other undesirable effects which may be imparted by the basic cation or acid anion, as the case may be, should be taken into consideration as well known in the art. Pharmaceutically useful salts should not be substantially more toxic than the compound itself and should be able to be incorporated in liquid or solid pharmaceutical media for the preparation of therapeutically useful compositions.

In employing the compounds of the present invention, they will normally be combined with a significant amount of a pharmaceutical carrier. The carrier may take a wide variety of forms, depending upon the form of the preparation desired for administration. For parenteral injection, the carrier may be sterile water with suitable adjustment of the pH to insure solution of the benzoxazole compound. For example, the base is practically insoluble in water while the salts vary in solubility, and in some cases the solubility of a salt is not sufficient to provide the desired concentration. In these cases the pH may be further adjusted. As stated, the preferred form of administration of the present compounds is oral and the oral dosage may be in the form of suspension, powder adapted for suspension in liquid media, tablet or capsule. In preparing the compositions in oral dosage form any of the usual pharmaceutical carrier media may be employed, such as gelatin, in the case of capsules; sterile water, glycols, oils, alcohols, and the like in the case of suspensions; starches, sugars, kaolin, salts, lubricant, binders, and the like, in the case of powders and tablets. Tablets represent the most advantageous oral dosage form.

The amount of compound administered and the amount of compound in any pharmaceutical composition or medical preparation may vary somewhat depending upon the severity of the condition and upon the species being treated. As far as administration is concerned, the amount of compound administered may range from that providing as little as about 2 milligrams of the benzoxazole compound per kilogram of body weight to that providing as high as about 100 milligrams per kilogram, preferably, in the case of humans, that providing between about 5 and about 40 milligrams of benzoxazole compound per kilogram of body weight. In pharmaceutical compositions, the concentration of the benzoxazole compound should be at least about 1%, by weight, preferably at least about 2%. The concentration of the benzoxazole compound may vary widely above these figures depending upon the form the composition takes, and in some cases the concentration of the benzoxazole compound may go as high as about 80–90%. Depending also upon the severity of the condition and upon the species being treated, as stated, the amount of benzoxazole compound per dosage unit form may also vary widely. Generally, the composition per dosage unit will contain at least about 25 milligrams of the benzoxazole compound, and in some cases, such as in compositions for the treatment of large domestic animals, like horses, the amount per dosage unit may range as high as 10,000. In the case of compositions adapted for human administration, the amount will generally range between about 100 and about 1000 milligrams of benzoxazole per dosage unit.

The present invention will be more readily understood from a consideration of the following specific examples which are given for the purpose of illustration and are not intended to limit the scope of the invention in any way.

*Example I*

To a solution of 251 g. (1.5 moles) of 2-amino-5-chlorobenzoxazole in 2000 ml. of methanol cooled to 10° C. is added slowly with stirring a cold solution of 250 g. (1.56 moles) of bromine in 450 ml. of methanol. After the addition is complete, stirring is continued for one and one-half hours while the temperature is maintained at 10–15° C. The acidic mixture is neutralized by the addition of 300 ml. of concentrated ammonium hydroxide and diluted with 2000 ml. of water. The precipitated solid is collected by filtration and recrystallized from methanol after charcoal treatment to give white crystals of 2-amino-5-chloro-6-bromobenzoxazole, M.P. 237–239° C.

The calculated nitrogen content for $C_7H_4BrClN_2O$ is: N, 11.3; that found: N, 11.3.

Injection intraperitoneally and intravenously of a 2% solution of this compound in sterile water containing sufficient hydrochloric acid to solubilize the compound and providing a pH of about 1.5, resulted in a loss of righting reflex by the test subjects of over 24 hours at doses ranging from 100–180 mg./kg. A comparable dose of 2-amino-5-chlorobenzoxazole resulted in a loss of righting reflex of 140 minutes. Oral preparations in the form of capsules containing the dry compound or as a 2% suspension of the compound in an aqueous solution consisting of 8.6% polyethylene glycol 300, 0.5% sodium carboxymethylcellulose and the remainder water have been administered resulting in an $LD_{50}$ ranging from 400 to 800 mg./kg. depending upon the species serving as test subject. In each case, however, the dose providing significant relaxation of skeletal muscle as manifested by loss of righting reflex was substantially below this level. Regardless of the route of administration the duration of action of this compound is markedly longer than that of 2-amino-5-chlorobenzoxazole.

Illustrating the uricosuric activity of the 2-amino-5-chloro-6-bromobenzoxazole, 300 mg. of this compound were administered orally in capsule form to an adult who before administration of the compound, excreted uric acid at the rate of 18 mg./hour. During the first hour after administration of the compound, the subject excreted 26 mg. of uric acid; during the second hour, 43 mg.; during the third hour, 38 mg.; during the fourth hour, 37 mg.; and during the fifth hour, 18 mg.

*Example II*

A solution of 2-amino-5-chloro-6-bromobenzoxazole in ether is treated with hydrogen chloride until precipitation is complete. Collection of the precipitate by filtration and recrystallization from a mixture of methanol and ether gives white crystals of 2-amino-5-chloro-6-bromobenzoxazole hydrochloride. Upon heating, the salt softens at 240° C., and decomposes at 260° C.

*Example III*

The following formula is for preparing 8000 tablets (10 grain) each containing 250 mg. of the 2-amino-5-chloro-6-bromobenzoxazole:

|  | G. |
|---|---|
| 2-amino-5-chloro-6-bromobenzoxazole | 2000 |
| Milk sugar | 800 |
| Dibasic calcium phosphate U.S.P. | 1527.2 |
| Starch (filler and disintegrating agent) | 799.3 |
| Calcium stearate | 56.7 |
| Gelatin solution (1.5 pounds per gallon) | |

*Example IV*

The following formula may be employed to make 1000 #3 capsules each containing 100 mg. of the 2-amino-5-chloro-6-bromobenzoxazole:

|  | G. |
|---|---|
| 2-amino-5-chloro-6-bromobenzoxazole | 100 |
| Milk sugar | 150 |
| Fill weight | 250 |

Considerable modification is possible in the selection of the particular form of the benzoxazole compound, as well as in the selection of carrier material and amount thereof in preparing pharmaceutical compositions comprising the compounds of this invention, without departing from the scope thereof.

I claim:
1. A compound selected from the group consisting of 2-amino-5-chloro-6-bromobenzoxazole and pharmaceutically acceptable acid addition salts thereof.
2. 2-amino-5-chloro-6-bromobenzoxazole.
3. Pharmaceutically acceptable acid addition salts of 2-amino-5-chloro-6-bromobenzoxazole.

References Cited in the file of this patent
UNITED STATES PATENTS

| 2,780,633 | Sam | Feb. 5, 1957 |
| 2,895,877 | Marsh | July 21, 1959 |